D. F. KRUMM.
AGRICULTURAL IMPLEMENT.
APPLICATION FILED DEC. 11, 1912.
1,127,781.
Patented Feb. 9, 1915.
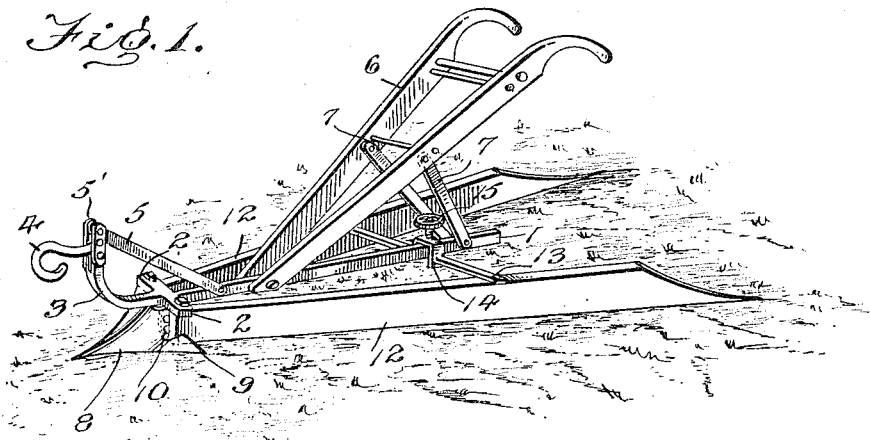
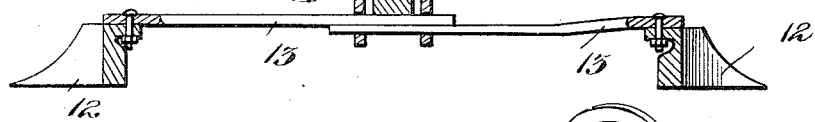
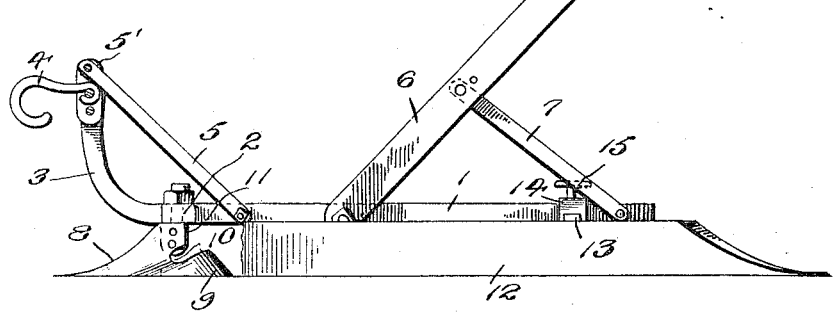
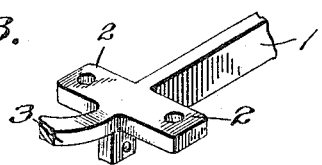
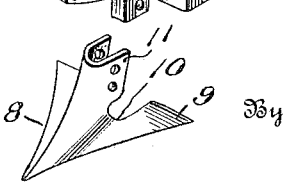
Inventor
D. F. Krumm

UNITED STATES PATENT OFFICE.

DAVID F. KRUMM, OF HALLANDALE, FLORIDA.

AGRICULTURAL IMPLEMENT.

1,127,781.   Specification of Letters Patent.   Patented Feb. 9, 1915.

Application filed December 11, 1912. Serial No. 736,112.

*To all whom it may concern:*

Be it known that I, DAVID F. KRUMM, citizen of the United States, residing at Hallandale, in the county of Dade and State of Florida, have invented certain new and useful Improvements in Agricultural Implements, of which the following is a specification.

This invention relates to agricultural implements, and has for its object the provision of a simple, inexpensive and labor-saving device by which the surface of a field may be readily made level and the loose surface soil thrown around tender stalks of growing plants; the device working under the side branches or stems close to the stalks without injuring them where a hoe or cultivator would tend to destroy.

The invention is illustrated in the accompanying drawings and consists in certain novel features which will be hereinafter first fully described and then more particularly pointed out in the appended claim.

In the annexed drawings: Figure 1 is a perspective view of my implement; Fig. 2 is an elevation of the same with parts broken away; Fig. 3 is a detail perspective view of the shovel and the front end of the central draft bar. Fig. 4 is a transverse section taken through the rear supporting means and looking toward the rear end of the implement.

In carrying out my invention, I employ a central draft bar 1 which is provided with a cross head or lateral lugs 2 near its front end and beyond said cross head or lugs has an upturned portion 3 constituting a standard to which a clevis may be attached, which clevis is intended to be engaged by a whiffle-tree or other draft device. A brace 5 preferably extends from the upper end of the standard 3 to a point upon the draft bar in rear of the cross head 2 so as to reinforce the structure, and the clevis 4 is preferably held within a forked extremity of the standard, indicated at 5′, so that lateral vibration of the clevis will not cause its detachment from the standard. To the draft bar at an intermediate point of the same, I secure the handles 6 which extend upwardly and rearwardly and are further connected with the draft bar by braces 7 so as to add to the rigidity of the structure. At the front end of the draft bar below the cross head or lugs 2, I secure a shovel or plow point 8 which extends forwardly from the draft bar and has lateral rearwardly diverging wings 9. The said wings 9 are disposed approximately below the lugs 2, but laterally beyond the same, and the rear edge of the shovel is recessed, as shown at 10, between the said wings and the upstanding portion 11 through which and the end of the draft bar the securing bolts are inserted. Pivotally attached to the extremities of the cross head 2 and arranged below the same are the side bars or scrapers 12 which extend rearwardly from the said cross head and the plow and are held at various degrees of divergence by means of links or connecting bars 13 which are secured at their outer ends upon the upper edges of the scrapers and have their inner ends inserted through a clip 14 which is fitted upon the draft bar 1 and held thereto by a set-screw 15, as shown. By moving the rear ends of the scrapers to or from each other and tightening up the set-screw, the scrapers may be adjusted to the width of the space between the rows and securely held in such adjustment.

The device is to be drawn over the field between the rows of plants and the shovel 8 will take into the loose surface soil and turn the same to the opposite sides of the path of the implement, the soil thus turned aside being prevented by the shovel and the wings 9 of the same from passing between the scrapers and being deposited in the path of the scrapers. The scrapers will act upon the dirt so as to push it toward the plants between which the implement is working and will leave the surface of the ground in a level condition, filling up the hollows and thereby protecting the roots and portions of the plants which may have been exposed and repairing damage which may have been caused by excessive rains. The device is exceedingly simple in its construction and may be economically manufactured and will be found highly efficient when in use.

The recesses in the rear edge of the shovel fit around the front ends of the scrapers so that the wings of the shovel overlap the same and it is, therefore, impossible for the loose dirt to escape the scrapers. The rear ends of the scrapers are tapered, as shown, so that they may work under the spreading vines and will not ride over and crush or bruise them.

What I claim is:—

An agricultural implement comprising a draft bar, a cross head at the front end of the draft-bar projecting laterally beyond the opposite sides thereof and having a depending longitudinally extending lug at the intersection of the cross-bar with the draft bar, a plow having a central upstanding portion embracing said lug, and detachably secured thereto, said plow having downwardly directed wings extending laterally beyond the opposite sides of the draft bar, each wing being provided with a recess disposed on its rear edge and below the corresponding end of the cross head, scrapers having their respective front ends pivoted to the ends of the cross head, the forward end of each scraper fitting in the recess of the corresponding wing of the plow whereby said wings project beyond the forward ends of the scrapers, and adjustable connections between the scrapers and the draft bars in rear of the front ends of the latter whereby the scrapers may be angularly adjusted with relation to the draft bar.

In testimony whereof I affix my signature in presence of two witnesses.

DAVID F. KRUMM. [L.S.]

Witnesses:
 EDWIN E. SOMEN,
 HOWARD KRUMM.